Dec. 1, 1959   R. KNOLLENBERG ET AL   2,915,401
PROCESS FOR MAKING MARGARINE
Filed May 27, 1957
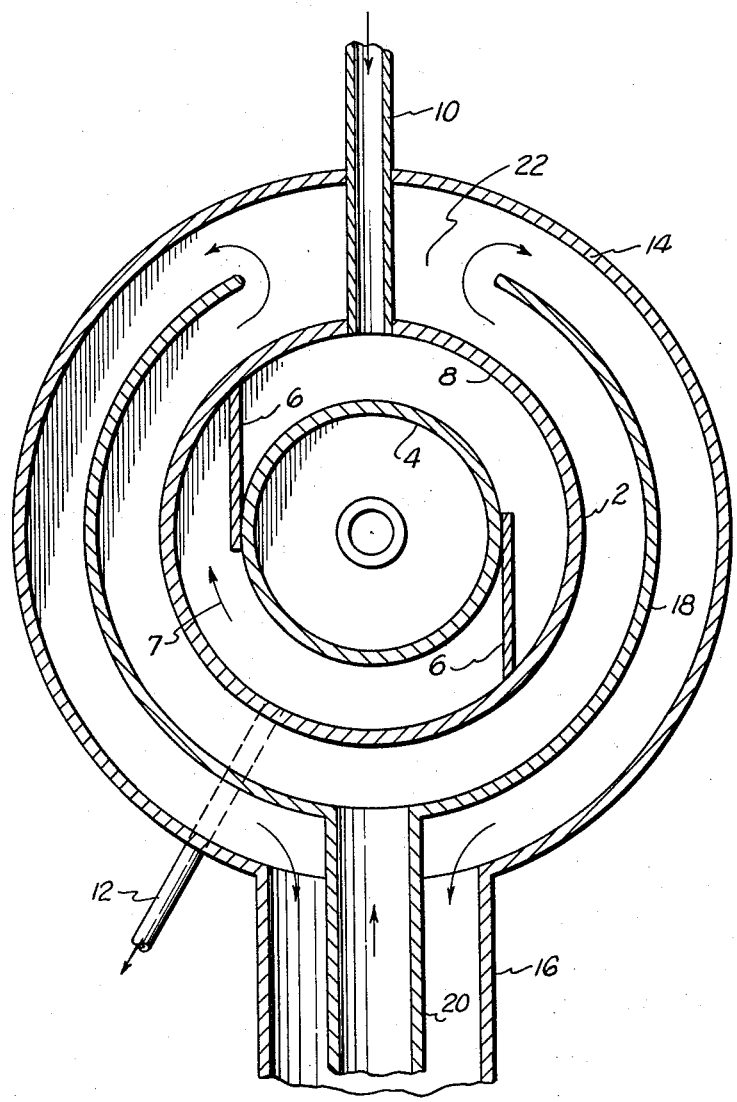
INVENTORS
Rudolf Knollenberg
Carl-Georg Hahn
BY
Bailey, Stephens & Huettig
ATTORNEYS

2,915,401

PROCESS FOR MAKING MARGARINE

Rudolf Knollenberg and Carl-Georg Hahn, Lubeck, Germany, assignors to Schroder & Co., Lubeck, Germany Application May 27, 1957, Serial No. 661,664

2 Claims. (Cl. 99—122)

This invention is directed to a process for making margarine. In particular, the invention is directed to the rate at which the margarine emulsion is passed through a cylinder in order to be chilled.

A conventional way of making margarine includes the chilling of the margarine mixture composed of a fat-water emulsion in one or more chilling cylinders in which the emulsion is stirred while being chilled. Scraper blades mounted on a shaft in the cylinder scrape the margarine which solidifies on the cold cylinder wall. The emulsion is passed continuously through the cylinder. The velocity of passage is kept high enough so that the chilled emulsion emerging from the cylinder has a consistency which enables it to be processed further. Ordinarily, the velocity of the margarine emulsion through the cylinder is about 1800 liters per hour per 1 m.² of the cylinder wall cooling surface area. The refrigerating fluid surrounding a cylinder has a temperature of about −15° C. Under such conditions, the margarine emerging from the cylinder is so soft that it cannot be packaged with the usual packaging machinery. Thus the margarine has to rest or undergo a preliminary setting for some time until it reaches a consistency stiff enough for the packaging machinery. In this resting time, another disadvantage occurs. This is because that, if the margarine rests or sets too long, it gets so hard that it again cannot be handled by the packaging machinery.

The object of this invention is to avoid the above disadvantages by obtaining a margarine neither too soft nor too hard to be handled immediately by the packaging machinery.

In general, the object is obtained by passing the margarine through the chilling cylinder with a velocity of from about 1200 to 1600 liters per hour, preferably 1500 liters per hour per 1 m.² of cylinder wall cooling surface.

The means by which the objects of the invention are obtained are disclosed more fully with reference to the accompanying diagrammatic drawing, which is a cross-sectional view through a chilling cylinder.

The chilling cylinder 2 contains a shaft 4 upon which are secured scraper blades 6. Cylinder 2 has an inside diameter of at least 110 mm. and preferably from about 120 to 140 mm. As shaft 4 rotates, margarine which has solidified on the inner wall 8 of cylinder 2 will be scraped therefrom. The liquid emulsion enters one end of cylinder 2 through inlet pipe 10 and is drawn from the opposite end of the cylinder through pipe 12.

The chilling cylinder is enclosed within a jacket 14 to which a pipe 16 is joined. Between the cylinder 2 and jacket 14 is a partition 18 to which is connected a tube 20, which has an outlet opening 22. Refrigerant is introduced through tube 20 and passes around cylinder 2 and out through opening 22 and returns on the other side of partition 18 to be exhausted through pipe 16.

In accordance with this invention, the emulsion passing from pipe 10 through cylinder 2 and out pipe 12 has a velocity of from about 1200 to 1600 liters per hour per 1 m.² of the surface area of wall 8, and preferably 1500 liters per hour per 1 m.². The refrigerant used to cool cylinder 2 has a temperature of about −15° C. In this new process, the margarine emulsion is subject to a longer cooling effect and a longer resting or stirring period while in cylinder 2 than heretofore used. Unexpectedly, it has been found that margarine treated according to this process emerges from cylinder 2 with a consistency stiff enough so that it can be immediately packaged by the packaging machinery. Again, even though the margarine undergoes a long resting period, it retains its smoothness and does not become so hard that packaging or repackaging presents any difficulties. The process can be employed in chilling cylinders having a diameter of 100 mm. The velocity of emulsion flow must then be kept much lower than customary in order to produce a margarine of suitable packaging consistency. A cylinder diameter of at least 110 mm. is suitable, with a diameter of 120 to 140 mm. being preferred. If the diameter of the cylinder is increased, an increase in the cooling surface wall area is also gained. At the same time the diameter of scraper shaft 4 is such that the distance between the surface of the shaft and surface 8 of the wall of cylinder 2 is from 3 to 7 mm., and preferably 5 mm.

A complete specific embodiment of the invention is as follows:

The apparatus is composed of a cylinder 2 having an inner diameter of 120 mm. within which the shaft 4 has a diameter of 110 mm., the space between shaft 4 and wall 8 being 5 mm. Scrapers 6 are 15 mm. wide and are rotated by shaft 4 at about 600 r.p.m. in the direction of arrow 7. The refrigerant cooling cylinder 2 has a temperature of −15° C.

An emulsion is prepared composed of:

| Percent | Ingredient | Melting Point, ° C. |
|---|---|---|
| 45 | Refined Coconut Fat | 24–25 |
| 25 | Whale Oil | 34 |
| 21 | Palm Oil | 32 |
| 9 | Soy | |
|  | Water for each 100 kg. of oil and fat to form a fat-water emulsion of 16% water and 84% fat. | |

This emulsion is introduced into cylinder 2 through tube 10 at a temperature of 32° C. and under a pressure of about from 30 to 50 atmospheres, with the rate of flow through the cylinder being about 1500 liters per hour per 1 m.² of cooling surface area.

The chilled emulsion removed through tube 12 has a temperature of 16° C. and is at atmospheric pressure.

This process produces a margarine of very good consistency in such unusually large chilling cylinders when keeping the indicated velocities, and this applies even though the proportion of the effective cooling surface wall area to the volume of the cylinder changes to the detriment of the effective cooling surface area.

Having now described the means by which the object of the invention is obtained, we claim:

1. In a process for making margarine by passing an emulsified mixture of margarine material through a chilled cylinder while stirring the mixture and scraping solidified material from the chilled wall of the cylinder, the improvement for producing a margarine having a consistency suitable for immediate packing after a single pass of the margarine material through the cylinder comprising passing the margarine material with a starting temperature of about 32° C. through the cylinder at a rate of from about 1200 to 1600 liters per hour per square meter of cylinder wall surface, and discharging the material from the cylinder at a temperature of about 16° C.

2. In a process as in claim 1, said cylinder wall being chilled to about −15° C.

References Cited in the file of this patent

Bailey: "Industrial Oil and Fat Products," 2nd ed., 1951, Interscience Publishers, Inc., New York, pp. 920–926.

Schwitzer: "Margarine and Other Food Fats," 1956, Interscience Publishers Inc., New York, pp. 248–250.